Patented Jan. 23, 1934

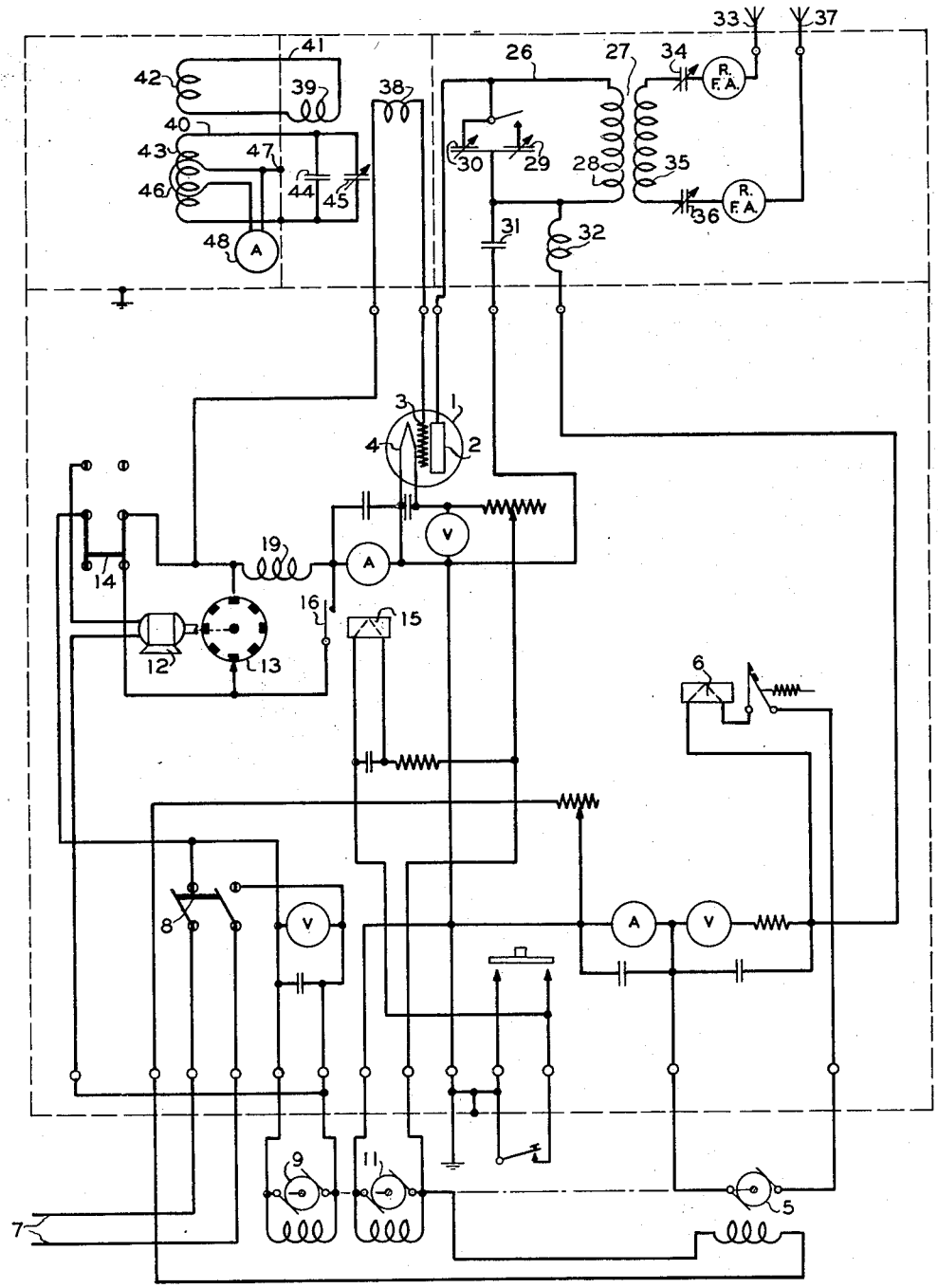

1,944,564

UNITED STATES PATENT OFFICE 1,944,564

WAVE METER

Elmer F. Lewis, East Orange, N. J., assignor to International Communications Laboratories, Inc., New York, N. Y., a corporation of New York Application August 13, 1930. Serial No. 474,910

5 Claims. (Cl. 250—39)

My invention relates to radio transmission systems and more particularly to a wave meter in such a transmission system.

An object of my invention is the provision of a wave meter for conveniently determining the working frequency.

In the use of high frequency currents, constant attention must be given to the frequency being generated. This is especially true if hetrodyne reception is employed at the receiving station.

This invention discloses a built-in wave meter providing improved means for continuously observing the frequency, as will be more fully explained in the following description when read in connection with the accompanying drawing, wherein the One figure is a diagrammatic representation of an embodiment of my invention.

Referring to the drawing, 1 is a thermionic oscillator of the internal feedback or other type, having a plate 2, grid 3, and a filament 4. Voltage is supplied to the anode from a source of electricity 5 through an overload relay 6. Mains 7 supply electric current through a switch 8 to the motor 9 and through switches 3 and 14 to the motor 12. Motor 9 operates filament heating generator 11 and motor 12 operates chopper 13 in the grid-filament circuit of the oscillator tube 1; and this circuit also contains a choke coil 19, and a movable contact 16. A relay 15 closes contact 16 and is controlled by means of key 17. These parts are so arranged that when the key 17 is closed, the choke coil 19 in the grid-filament circuit of the tube is shortcircuited to start the oscillation of the tube; the chopper 13 being in or out of circuit according to the position of the switch 14. These devices and their respective circuit need not be further described, as they form no part of this invention.

The output circuit of the oscillator consists of a tuned circuit 26 having an inductance 28 which serves as the primary transformer 27 and shunt capacity 29 and 30, both being of the variable type. The alternating current path in the plate circuit may be traced from plate 2 through tuned circuit 26, blocking condenser 31 to filament 4. A radio frequency coil 32 keeps the high frequency out of the anode supply circuit.

The radiating system consists of antenna 33, variable condenser 34, inductance 35 which serves as the secondary of the transformer 27, variable condenser 36 and counterpoise 37.

The wave meter circuit, to be hereafter described, forms the subject matter of this invention. Grid inductance 38 is inductively coupled to an untuned link circuit 41 by means of inductance 39. Inductance 42 of link circuit 41 is coupled to tuned circuit 40 by means of inductance 43. Fixed condenser 44 and variable condenser 45 are connected in shunt to coil 43. Coil 46 is inductively coupled to coil 43 and has in series with it thermoammeter 48. The thermoammeter is grounded to the frame of the transmitter at 47.

All circuits are loosely coupled and a maximum current will be present in the tuned circuit 40 only when the generated frequency is very close to the frequency to which the circuit 40 is tuned. The variable condenser 45 has a dial graduated or calibrated in either meters or kilocycles or both, and this condenser is adjusted to the frequency to be generated. Then the constants of the oscillator and radiating circuits are adjusted until a maximum reading is shown in the thermoammeter 48, the maximum reading evidencing the proper adjustment. Variation from this maximum reading will indicate that the required frequency is not being obtained.

The meter 48 being in a separate circiut of its own, the resistance of the tuned circuit is greatly reduced. Hence, the responsiveness and accuracy of the frequency meter are greatly increased.

Although only one embodiment of my invention is shown, it is obvious that many modifications may be used without departing from the spirit of my invention, and it is therefore desired that only such limitations be placed thereon as are imposed by the prior art and the claims.

What is claimed is:

1. In a radio transmission system, an oscillator having grid and plate circuits an inductance in said grid circuit, and means magnetically coupled with said grid circuit inductance for indicating the frequency of said oscillator, said means comprising a link circuit, a tuned circuit inductively coupled to said link circuit, and a loop circuit including a thermoammeter, said loop circuit being inductively coupled to said tuned circuit.

2. In a radio transmitter, an oscillator having grid and plate circuits, an inductance in said grid circuit, an untuned link circuit inductively coupled with said grid circuit inductance, a tuned circuit magnetcally coupled with said link circuit, and means inductively coupled with said tuned circuit for indicating the generated frequency.

3. In a radio transmitter, an antenna, a thermionic oscillator of the feed-back type connected thereto, a grid circuit for said oscillator, a tuned circuit, an untuned link circuit inductively coupling said grid and tuned circuits, and a loop circuit having a thermo-ammeter, said loop circuit being grounded and inductively coupled to the tuned circuit.

4. In a radio transmitter, a radiating system, a thermionic oscillator having a tuned plate circuit coupled to said radiating system and an untuned grid circuit, and means inductively coupled to said grid circuit for ascertaining the generated frequency, said means comprising a tuned circuit, a link circuit coupling said grid and tuned circuits, and a loop connected to an indicating instrument, said loop being inductively coupled to the tuned circuit.

5. In a radio transmitter, a radiating system, a thermionic oscillator having a tuned plate circuit coupled to said radiating system and an untuned grid circuit, an untuned link circuit coupled with said grid circuit, a tuned crcuit coupled with said link circuit, and a grounded meter circuit inductively coupled with said tuned circuit.

ELMER F. LEWIS.